United States Patent
Pisecker

[15] 3,683,251
[45] Aug. 8, 1972

[54] SUB-SYNCHRONOUS STATIC CONVERTER CASCADE

[72] Inventor: Johann Pisecker, Nussbaumen, Switzerland

[73] Assignee: Aktiengesellschaft Brown, Boveri & Cie, Baden, Switzerland

[22] Filed: Dec. 21, 1970

[21] Appl. No.: 99,837

[30] Foreign Application Priority Data

Jan. 14, 1970   Switzerland................465/70

[52] U.S. Cl..................................318/237, 318/241
[51] Int. Cl. .................................................H02p 7/62
[58] Field of Search...............318/197, 237, 240, 241

[56] References Cited

UNITED STATES PATENTS 3,227,937   1/1966   Koppelmann et al......318/237
3,136,937   6/1964   Miljanic.....................318/197
3,504,254   3/1970   Rosenberry, Jr. .........318/197
3,526,816   9/1970   Paice et al. ............318/237 X

*Primary Examiner*—Gene Z. Rubinson
*Attorney*—Pierce, Scheffler & Parker

[57] ABSTRACT

A sub-synchronous static converter cascade with a slip-ring motor and a static frequency converter connected to the rotor of the motor in which the converter comprises a diode rectifier and a static converter operating as a mains-controlled static converter. A resistor and a voltage-controlled thyristor switch forming a series circuit is connected in parallel with the static converter, and a high-speed circuit breaker bridged by a second resistor is connected between the diode rectifier and the junction of the thyristor switch with the static converter.

1 Claim, 6 Drawing Figures

Inventor
Johann Pisecker

By Pierre Schiffler & Parker
Attorneys

Inventor
Johann Pisecker

Inventor
Johann Pisecker

By Pierce, Scheffler & Parker
Attorneys

SUB-SYNCHRONOUS STATIC CONVERTER CASCADE

This invention relates to a sub-synchronous static converter cascade with slip-ring motor and static frequency converter, connected to the rotor and comprising a diode rectifier and a static converter, operating as a mains controlled inverter, and also a method for operating such apparatus.

In known sub-synchronous static converter cascades a static frequency converter is connected in normal operation to the rotor side of a slip-ring motor which is driven through a starting resistor to a speed above the minimum operating speed. The frequency converter comprises a diode rectifier and a thyristor converter adapted to operate as a mains controlled inverter. Speed adjustment in this case is obtained by the introduction of the controllable inverter d.c. voltage which acts against the rectified rotor voltage which in turn is proportional to the slip. A smoothing choke decouples three-phase systems of different frequency which are connected via the intermediate d.c. circuit. Voltage matching which is normally required is obtained through a transformer.

When sub-synchronous static converter cascades with a large power output are used for applications having particularly stringent requirements regarding the operational reliability (for example in power stations or in the chemical industry), the operating characteristics of the cascade under abnormal conditions will have an increased significance, for example in the event of a sudden voltage collapse and interruption in the supply mains, mains short circuits and the like. Although the same kind of operation and fault cannot be excluded in other industrial applications for these static converter cascades, little attention was evidently paid to them hitherto since no reference relating thereto can be found in the numerous publications on sub-synchronous static converter cascades.

The cascade circuit, preferred hitherto for industrial applications, offers only very limited facilities for interrupting within a few milli-seconds the overcurrents which results from unexpected faults such as failure of the regulating and control equipment, sweeping of the inverter, internal and external short circuits, brief interruptions in the supply mains etc., or for limiting such overcurrents to values which do not represent any excessive stresses for the semi-conductor static converter until the circuit is interrupted by the a.c. circuit breaker. Moreover, the voltages induced as the result of switching operations in the supply mains on the rotor side and which may, in some cases, be higher than the locked rotor voltage, become fully effective on the rectifier as well as on the inverter if the intermediate d.c. circuit is dead. Both stresses, the current stresses as well as the voltage stresses, would have to be taken into account in the design of the static converters if sequential damage is to be avoided. A timely changeover to the starting resistors cannot be considered in the majority of faults in view of the internal delay of the three-phase circuit breakers which are available.

Current-over-dimensioning is generally no longer necessary for faults having the nature of a short circuit if a high-speed d.c. circuit breaker is provided in the d.c. intermediate circuit, such circuit breaker being designed to operate within a few milli-seconds when a preset current value is exceeded, and the circuit breaker supplying an arc voltage which is higher than the source voltage which drives the over-current.

As shown by simple comparative calculations relating to the yield of the over-voltage source, low-energy attenuation means (for example d.c. capacitors, coupled into the circuit via diodes, self-quenching arc gaps and the like) are not suitable in practice for reducing the voltage stresses. A reduction of the over-voltages in the rotor can be achieved only by the use of protective resistors having a relatively low ohmic value and which are adapted for instantaneous switching into the circuit when over-voltages occur, such reduction of the rotor over-voltage influencing the voltage design.

It is the object of the present invention to provide a sub-synchronous static converter cascade which operates reliably even in the event of sudden voltage changes and interruptions. Furthermore, the operating means additionally required for modifying the circuit should have the maximum possible operational reliability in view of the protective function which they have to perform.

The problem is solved in accordance with the invention for a static converter cascade of the kind mentioned heretofore in that a current branch, comprising a resistor and a voltage controlled thyristor switch is connected in parallel to the static converter and that a high-speed circuit breaker, bridged by a second resistor when in the open state, is connected between the junction of the thyristor switch with the static converter and the diode rectifier.

Exemplified embodiments of the invention are explained hereinbelow by reference to the accompanying drawings in which.

Figure 1:
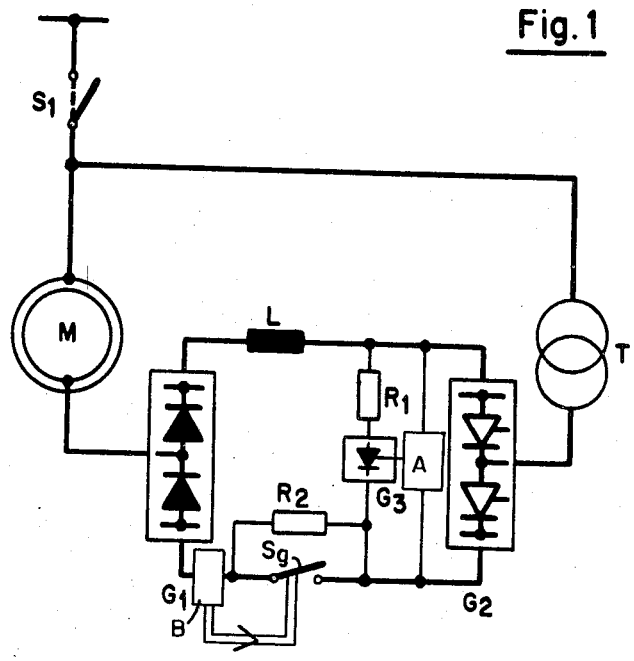
FIG. 1 shows a sub-synchronous static inverter cascade immediately prior to the first running-up phase.

With reference now to FIG. 1 the static converter system is seen to comprise a slip-ring motor M and a static frequency converter. The frequency converter comprises a diode rectifier $G_1$ and an inverter $G_2$. The smoothing inductor L is connected in one branch of the frequency converter while the other branch contains the high-speed circuit breaker $S_a$ which is bridged by a resistor $R_2$. A serial circuit, comprising a resistor $R_1$ and a thyristor switch $G_3$, is connected in parallel to the inverter $G_2$.

As will be more fully explained hereinafter in detail, a current detecting and control means B is included in the intermediate d.c. circuit and functions to open the high-speed circuit breaker $S_a$ in the event that the current in this intermediate circuit rises above a predetermined value. Also, as will be explained more fully hereinafter, a voltage detecting and control means A is also included in the intermediate d.c. circuit which functions to measure the voltage in this circuit and causes the silicon controlled rectifier switch $G_3$ to fire when this voltage exceeds a predetermined value.

The method of operation of the system with different operating conditions is described in detail hereinbelow. The two-stage run-up into the operating range will be described first.

FIG. 1 illustrates the circuit condition of the sub-synchronous static converter cascade immediately before the stationary cascade motor is connected to the mains, a solid symbol indicating the readiness of the converter diodes to conduct current (in the same way as in the subsequent basic circuit diagrams). A nonsolid symbol refers to open switches. The high-speed d.c. circuit breaker $S_g$ is open at the beginning, current conduction of the inverter $G_2$ is interrupted (by a pulse blocking instruction applied to the associated control set for the duration of the run-up phase) and the thyristor switch $G_3$ is closed (by means of a continuous control pulse which precedes switching in of the mains.

Figure 2:
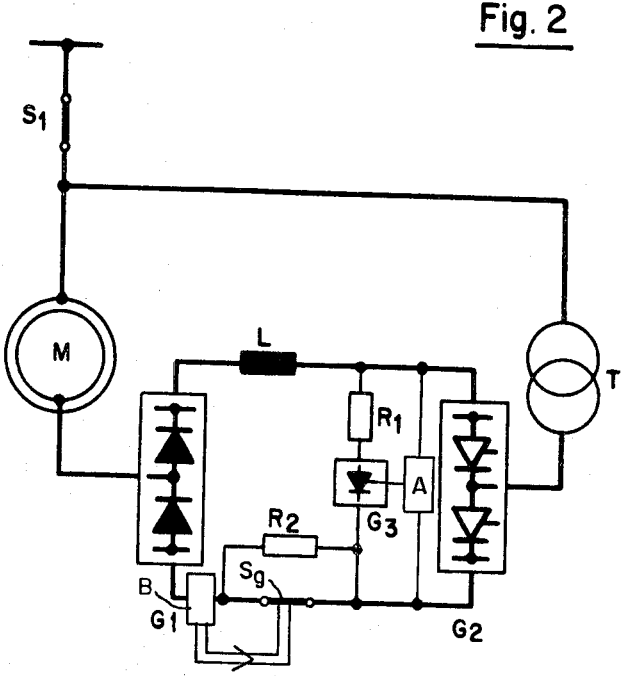
FIG. 2 shows the sub-synchronous static converter cascade during the second running-up phase.

Connection to the mains (i.e. closing of the mains switch $S_1$) initiates the running-up procedure. During the first phase of the running-up procedure, the starting current of the cascade motor is limited by the serial connection of the resistors $R_1$ and $R_2$. Owing to the voltage divider effect, only the voltage proportion which occurs across the resistor $R_1$ will appear on the d.c. side of the inverter $G_2$, said voltage proportion diminishing with an increasing rotational speed in accordance with the falling rotor voltage. When the speed reaches a certain value adapted to the appropriate conditions, closing of the high-speed d.c. circuit breaker (i.e. by bridging of the resistor $R_2$) performs the second running-up stage and therefore achieves a better running-up performance (see also FIG. 2). If the running-up conditions are pre-defined, the d.c. circuit breaker can also be fundamentally controlled relative to time.

Figure 4:
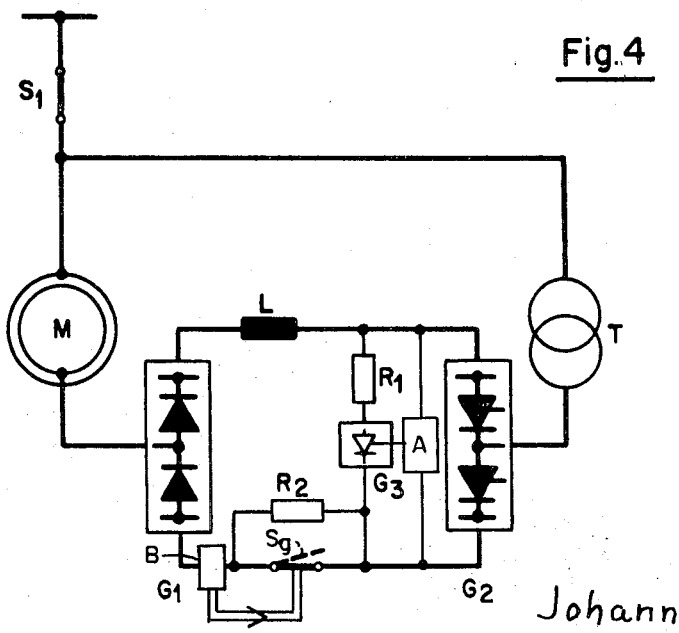
FIG. 4 shows the circuit condition of the sub-synchronous static inverter cascade during normal operation.

The inverter $G_2$ is triggered to conduct current by removal of the pulse block as soon as the cascade motor exceeds the lower limiting speed of the operating range. The actual running-up procedure is completed when the thyristor switch $G_3$ is extinguished, a process which takes place by natural commutation if the inverter is provided with a pulse bias, the cascade will then have reached the normal operating condition as illustrated in FIG. 4.

Figure 3:
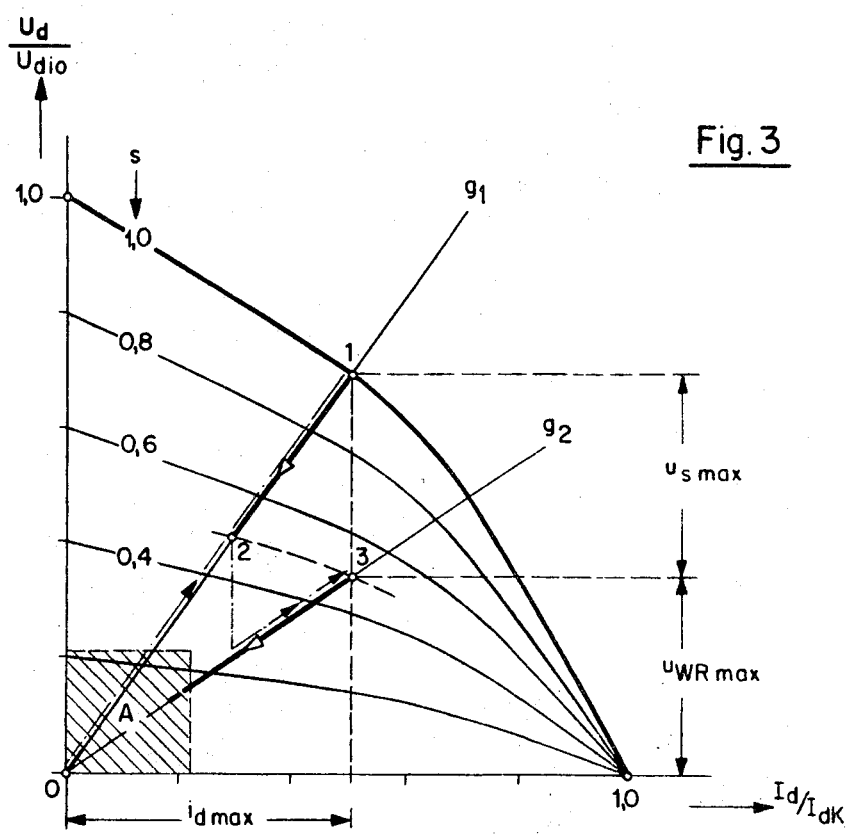
FIG. 3 shows the current and voltage stresses during the running-up phase.

The current and voltage stresses which occur during running-up in the cascade range may be obtained from the graph of FIG. 3. The standardized operating characteristics of the rectifier $G_1$ are plotted in this graph for different values of slip $s = 1.0$ to $0.2$, the two resistance straightlines $g_1$ and $g_2$ being also plotted in the graph. The following standard values are selected in this case: $I_{dK}$—continuous short circuit current under locked rotor conditions, $U_{dio}$—ideal no-load d.c. voltage under locked rotor conditions.

The following expressions are also used:

$i_d = I_d/I_{dK}$    $I_{dK} = \sqrt{2}(U_{Ro}/X'_r)$    intermediate circuit current $u_d = U_d/U_{dio}$    $U_{dio} = (3/\pi)\sqrt{6}\, U_{Ro}$    intermediate circuit voltage $g_1 \ldots u_1 = (R_1 + R_2)I_d/U_{dio}$, on the assumption that $R_1 = R_2$ $g_2 \ldots u_2 = R_1 I_d/U_{dio}$ $u_s \ldots$ voltage across the contact gap of $S_g$ $u_{WR} \ldots$ voltage across the inverter $G_2$.

The resistance straightline $g_1$, representing the resultant resistance of the first running-up stage, corresponds to the resistance sum $R_1 + R_2$. Furthermore, $g_2$ is associated with the resistance of the second running-up stage, i.e. the resistor $R_1$. In the interests of simplification it was assumed that $R_1 = R_2$. In order to establish a relationship to the operating stresses, the normal operation zone designated with the letter A and relating to a sub-synchronous static inverter cascade designed for a maximum slip of 20 percent was plotted as a hatched area in the illustration.

The operating point 1, obtained as the point of intersection of the rectifier operating characteristic for stationary conditions ($s = 1$) with the resistance straightline $g_1$, is obtained within a few milli-seconds after the sub-synchronous static inverter cascade is connected to the mains. As the rotational speed increases, the operating point in the first running-up phase travels on the straightline $g_1$ against the origin. At point 2, the rotational speed will have reached the value at which changeover to the second running-up stage takes place. The operating point 3, disposed on the resistance straightline $g_2$ is obtained immediately after bridging of the resistor $R_2$, and starting from said operating point 3, the cascade runs up into the range of normal operation A in which the inverter conducts current. The stress values associated with the appropriate operation point may be obtained from the graph:

$I_d = i_d \cdot I_{dK}$    current stressing of the rectifier $G_1$ and of the thyristor switch $G_3$ $U_{WR} = U_{WR} \cdot U_{dio}$    voltage stressing on the d.c. side of the inverter $U_s = u_S \cdot U_{dio}$    voltage across the contact gap of the high-speed d.c. circuit breaker.

The circuit condition of the system in normal operation is illustrated in FIG. 4. The high-speed circuit breaker $S_g$ is closed and the slip power associated with the affected operating point is returned into the supply mains through the inverter $G_2$. The thyristor switch $G_3$ is opened and prevents continuous loading of the resistor $R_1$.

The system described hereinabove does not therefore differ from the known system under normal operating conditions.

For most applications of sub-synchronous static inverter cascades it may be assumed that stationary operation is accompanied by an uninterrupted current flow in the intermediate d.c. circuit and therefore a practically continuously closed rotor circuit. However, in the case of quick-acting regulating apparatus or in the event of major regulating deviations it is possible that the current in the intermediate d.c. circuit is temporarily completely reduced in order to achieve the maximum possible delay. Moreover, in the interests of uniform instantaneous or high-speed changeover switching of one load group, it is appropriate for the rotor current in the cascade motors to be completely reduced immediately prior to rupturing from the original mains and subsequently to maintain the dead state of the intermediate d.c. circuit by means of a pulse block on the inverter for the entire changeover period. In order therefore to take account of the actual and possible stresses it is necessary to examine the method of operation of the proposed cascade circuit both with the intermediate d.c. circuit carrying current and carrying no current (see FIG. 4 and FIG. 5).

Stresses which exceed operational values may be the result either of faults within the cascade (for example short-circuit, block and/or blockage losses of the diodes, failure of the regulating and control apparatus etc.) or they may be due to sudden changes of the mains voltage (for example voltage collapse and interruption, mains short circuit, voltage return in an unfavorable phase). While faults of the first kind generally require operation of the cascade to the interrupted in order for the fault to be remedied, temporary mains disturbances, particularly in applications subject to stringent requirements regarding operational safety and reliability, should not cause any substantial restriction of operation or even result in consequential damage in the cascade range.

It is known that voltage changes in the supply mains result in more or less well-defined compensating phenomena in the connected asynchronous machines. In the event of sudden changes by large amounts it is possible for the different compensating variables to temporarily amount to a multiple of the operating values so that not only the machines themselves but also other electrical operating media are stressed to a very high degree. This also applies particularly to subsynchronous static converter cascades in which, in the absence of suitable measures, the full magnitude of the compensating variables act on the semi-conductor static converters which are particularly sensitive to overstressing.

In order to formulate the following description of the method of operation of the proposed circuit in the event of mains disturbances as clearly as possible, it is proposed that the following simplifying assumptions be made:

1. The asynchronous machine is operated with a small amount of slip, i.e. near synchronism. The alternating locked rotor voltage is practically absent by contrast relative to the compensating component.
2. The asynchronous machine is operated either near the no-load point or with a quasi-open rotor circuit (with a blocked rectifier $G_2$ and an open thyristor switch $G_3$). The locked rotor current may therefore be neglected relative to the compensating current.
3. Saturation effects in the asynchronous machine are also neglected. Allowance for the resistance of the winding is made only by the introduction of appropriate decay period constants.
4. During the mains disturbance the inverter $G_2$ is either operated with a modulation angle of nearly 90° and does not therefore supply any average reverse voltage or it is completely driven to cut off by means of pulse suppression.
5. The transient overshoot of the compensating current in the intermediate d.c. circuit immediately after the disturbance begins is neglected. This is permissible particularly in cases in which the intermediate d.c. circuit contains a relatively high ohmic active resistance in addition to a smoothing inductance.

Figure 6:
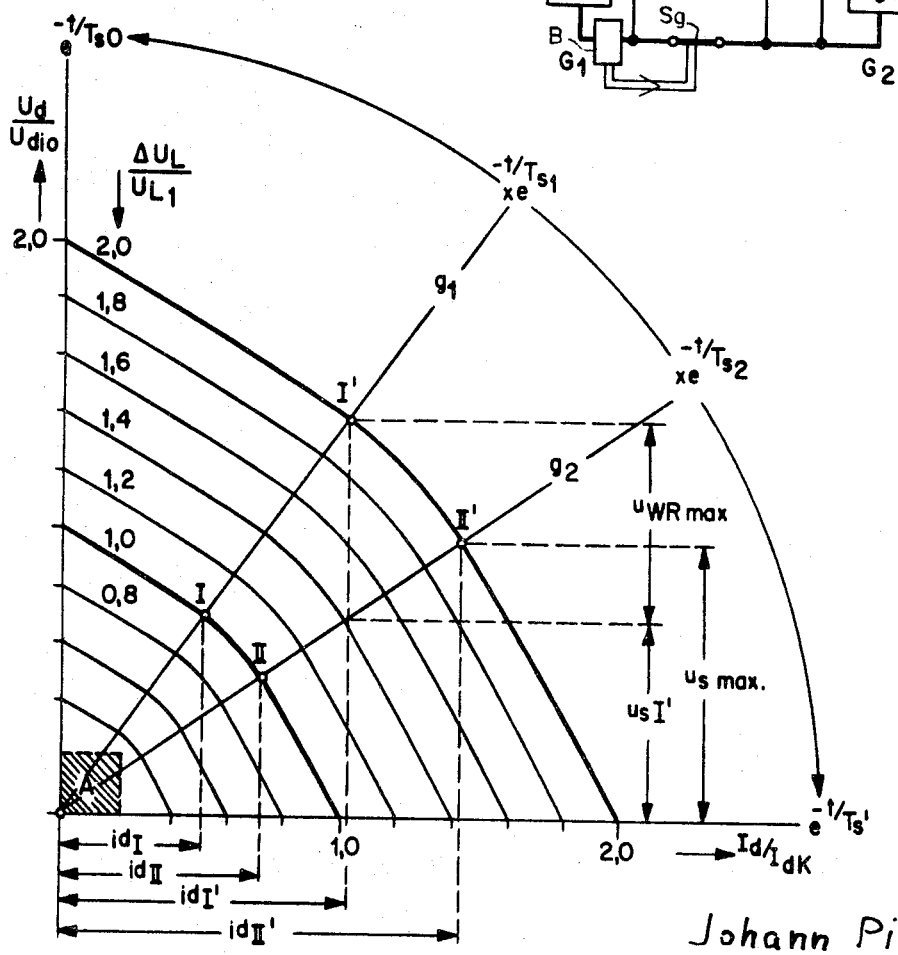
FIG. 6 is a plot depicting current and voltage stresses when subject to sudden mains voltage changes $\Delta U_L$.

By making these assumptions, it is possible for the current and voltage compensating components resulting from a sudden change of mains voltage to be displayed in clear diagrammatic form. This is shown in FIG. 6. In this graph, the symbols $i_d$, $u_d$, $g_1$, $g_2$, $U_{WR}$ and $u_s$ have the same significance as in FIG. 3. The following additional terms are employed:

$T_s$ ...... time constant of the d.c. stator field $T'_s < T_{s2} < T_{s1} < T_{so}$ I, II transient current and voltage stresses in the event of mains short circuit I', II' transient current and voltage stressing on reclosing in phase opposition t ...... time elapsed from the beginning of the disturbance According to FIG. 6, any change of mains voltage can be associated with a defined rectifier output characteristics with which the operating points would coincide for different load changes if the compensating components would not decay. In actual fact, however, and on the assumption of linear relationships, the compensating components diminish exponentially. A first approximation of the salient decay period constants are obtained by converting the active resistance on the d.c. side into an equivalent resistance of the a.c. side to which the active resistance of the rotor winding is added. Depending on the ohmic value of the resistance on the d.c. side, this yields active stator time constant (responsible for the reduction with respect to time of the stator side "d.c. element" and therefore for the characteristic of the current compensating component in the intermediate d.c. circuit) which are disposed between the appropriate transient value $T'_s$ (30 ... 150 milli-seconds) and no-load value $T_{so}$ (1.0 to 4.0 seconds) of the related asynchronous machine. The rotor time constants diminish rapidly towards zero with an increasing resistance value, and in considering the circumstances described hereinbelow, they can usually be neglected relative to the stator time constant. As shown in FIG. 6, the variation of the compensating current with respect to time can be allowed for by introducing a time-dependent factor exp $(-t/I_{st})$ associated with the appropriate resistance straightline.

For as long as the mains voltage varies by only small amounts when the cascade conducts current (FIG. 4), the compensating current will reach the short circuit value corresponding to the magnitude of the appropriate voltage step response $\Delta U_L/U_{L1}$ after a few milli-seconds, this short circuit value corresponding to the abscissa value of the graph in FIG. 6, and subsequently decay at the transient machine time constant $T'_s$. In the event of voltage changes by larger amounts, for example in the event of mains short circuit near the cascade and the like, as detected by the current detection and control device B inserted in the intermediate circuit, the output from the device B as applied to the tripping mechanism of the high-speed d.c. circuit breaker S will be exceeded whereupon, the circuit breaker $S_o$ causes the tripping value of the current to be interrupted as indicated by broken lines in FIG. 4 and the resistor $R_2$ will be incorporated into the intermediate d.c. circuit. This proceeds within a few milli-seconds, i.e. before the current has reached the short circuit value associated with the appropriate rectifier output characteristic. In this manner, the compensating current is limited, practically without overshoot, to the value defined by the point of intersection of the appropriate rectifier characteristic and the resistance straightline $g_2$. Decay then takes place at the time constant $T_{S2}$ associated with the terminating resistance.

As shown by the graph of FIG. 6, it would be theoretically possible to limit the current stresses which accompany sudden changes of mains voltage and other disturbances to any desired small value by increasing the resistance of $R_2$. However, since an increasing resistance value involves a corresponding increase in the switching voltage $U_S$ of the high-speed d.c. circuit breaker, and since, moreover, the increased decay period time constant would also result in a severe loss of rotational speed, the value of the resistance $R_2$ will be made only as high as is necessary to avoid any possible sequential damage. However, due account must be taken of the fact that the effect of saturation reduces the actual stress values to a relatively greater extent as the magnitude of the voltage step increases. For example, in the event of a mains short circuit in the immediate vicinity of the cascade motor (i.e. when $\Delta U_L / U_{L1} \approx 1.0$) a reduction by about 20 percent in the stressing must be expected while in the event of voltage recovery in phase opposition (i.e. when $\Delta U_L / U_{L1} \approx 2.0$) a reduction by as much as 30 percent would have to be expected.

Figure 5:
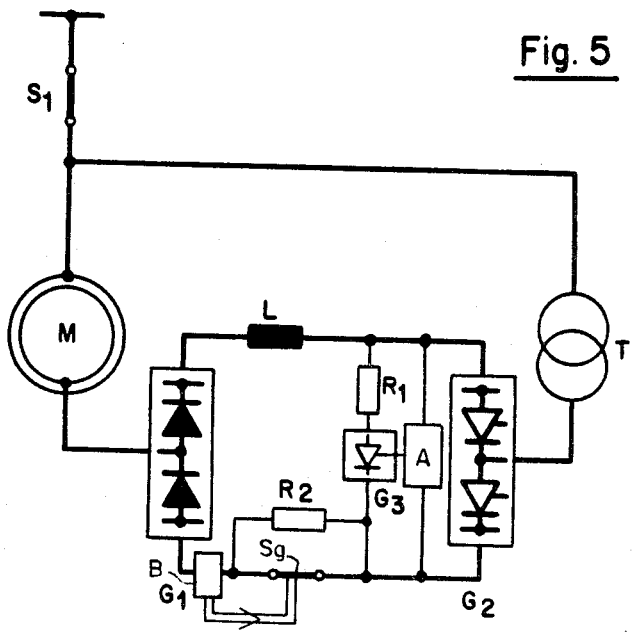
FIG. 5 shows the sub-synchronous static converter cascade with a dead intermediate d.c. circuit.

A fundamental distinction between three cases must be made as regards the effects of mains voltage fluctuations when the cascade is dead (the starting condition is shown in FIG. 5). If the voltage changes by small amounts, the voltage dependent controlled thyristor switch $G_3$ will remain open and the dead state of the sub-synchronous static converter cascade will prevail even after the stepped voltage change. However, if the change of mains voltage results in an intermediate circuit voltage as measured by the voltage detecting and control means A which is greater than the voltage at which automatic modulation of the thyristor switch is started, the previously open intermediate d.c. circuit will be closed within a few milli-seconds via the resistor $R_1$ by firing the controlled thyristor switch $G_3$ from the output of the device A, i.e. the circuit condition shown in FIG. 2 will be reached. The d.c. voltage stress of the inverter $G_2$ therefore remains limited to the voltage drop which occurs across the resistor $R_1$. Finally, if the change of mains voltage is of such magnitude that the compensating current, flowing through $R_1$, causes the highspeed d.c. circuit breaker $S_g$ to be tripped, this will be automatically followed by the circuit condition illustrated in FIG. 1 in which the resistor $R_2$ is additionally inserted into the intermediate d.c. circuit. The rectified rotor voltage acts on the inverter only in the ratio $R_1/(R_1 + R_2)$ owing to the voltage divider effect of the two resistors, as can also be seen by reference to FIG. 6.

The means for greatly reducing the voltage stress on the inverter by voltage division is of particular interest in applications in which there is a demand for instantaneous or rapid changeover switching of individual drives or for a common changeover of entire groups of drives. The current in the intermediate d.c. circuit is reduced at the highest possible speed after the mains changeover command is given, namely by targeted interference in the grid control system. The condition of the quasi-open rotor circuit illustrated in FIG. 5 (inverter $G_2$ and thyristor switch $G_3$ driven to cut off) will be reached before the definitive isolation from the mains is completed if the high speed d.c. circuit breaker $S_g$ is tripped at the same time. If reconnection of the mains does not take place at a phase which is favorable relative to the residual voltage, the thyristor switch $G_3$ will close automatically at the moment at which the mains is connected and the rectified rotor voltage will subsequently decay, approximately with the transient stator time constant. Changeover into the state of normal operation (FIG. 4) is performed in the same manner as in running-up by natural commutation, namely as soon as the intermediate circuit voltage has decayed to operating values.

The voltage stress across the inverter part of the cascade will therefore become smaller the lower the choice of the ohmic value for the resistor $R_1$. This is counteracted substantially by the resulting increase of the compensating current through the thyristor switch $G_3$ (see FIG. 6). It is therefore particularly essential to allow for the appropriate economic considerations when the optimum value of the resistance is defined.

The circuit stability of the sub-synchronous static converter cascade can be substantially increased in the proposed circuit configuration with a relatively slight effort. Current and voltage stresses which occur in the cascade range in the event of mains disturbances and which may in some circumstances amount to a multiple of the operating values, can be controlled without sequential damage if the individual parts are suitably dimensioned and matched. This is of importance, particularly for applications in which very stringent requirements are made regarding operational safety and reliability, for example in power station operation where sub-synchronous static converter cascades are being increasingly used as drives for boiler feed pumps, the operation of which should not be endangered in any manner by temporary mains disturbances. It should also be mentioned that the present circuit configuration closely meets the requirements of the instantaneous or rapid changeover switching which is desired for various applications.

A further advantage of the system is due to the fact that it is possible to dispense with the switch gear previously provided for the starting of the cascade motor. Furthermore, it is not difficult to perform the running-up operation as described in two steps thus greatly improving the running-up characteristics. After completion of the running-up procedure, the normal operating state is obtained in simple manner by natural commutation of the starting current to the inverter.

I claim:

1. In a circuit arrangement for operating a slip-ring induction motor in the sub-synchronous range wherein the slip energy is fed back into the mains by means including an intermediate direct current circuit comprising a diode rectifier and a mains-controlled static inverter connected in cascade, the combination comprising a first resistor and a silicon controlled rectifier switch arranged in series therewith and which is connected in parallel with said inverter, said rectifier switch and said inverter being correlated such that said rectifier switch is rendered non-conducting when said inverter is operating, a first detecting and control means monitoring the voltage of said intermediate circuit and which applies its output to effect a firing of said rectifier switch when the voltage of said intermediate circuit exceeds a predetermined value for an operating mode when said inverter is cut off, and a circuit breaker having a second resistor arranged in parallel therewith and which is connected between said diode rectifier and the junction point at which said rectifier switch connects with said inverter, said circuit breaker being normally closed when said inverter is operating, and a second detecting and control means monitoring the direct current in said intermediate circuit and which applies its output to effect an opening of said circuit breaker when the current in said intermediate circuit exceeds a predetermined value thereby to introduce the resistance of said second resistor into said intermediate circuit.

* * * * *